(12) United States Patent
Makino

(10) Patent No.: US 9,386,232 B2
(45) Date of Patent: Jul. 5, 2016

(54) IMAGE PROCESSING APPARATUS WHICH COMPOSES A PLURALITY OF IMAGES SHOT UNDER DIFFERENT EXPOSURE CONDITIONS AND IMAGE PROCESSING METHOD

(71) Applicant: CANON KABUSHIKI KAISHA, Tokyo (JP)

(72) Inventor: Jun Makino, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 14/012,040

(22) Filed: Aug. 28, 2013

(65) Prior Publication Data

US 2014/0071311 A1 Mar. 13, 2014

(30) Foreign Application Priority Data

Sep. 7, 2012 (JP) ................................. 2012-197900

(51) Int. Cl.
*H04N 5/232* (2006.01)
*H04N 5/235* (2006.01)
*G06T 5/50* (2006.01)
*H04N 5/243* (2006.01)

(52) U.S. Cl.
CPC ............. *H04N 5/2355* (2013.01); *G06T 5/50* (2013.01); *H04N 5/2353* (2013.01); *H04N 5/2356* (2013.01); *H04N 5/23229* (2013.01); *G06T 2207/10144* (2013.01); *G06T 2207/20208* (2013.01); *H04N 5/243* (2013.01)

(58) Field of Classification Search
None
See application file for complete search history.

(56) References Cited

U.S. PATENT DOCUMENTS

| | | | |
|---|---|---|---|
| 2008/0095408 A1* | 4/2008 | Yokohata et al. | 382/106 |
| 2008/0187235 A1* | 8/2008 | Wakazono et al. | 382/255 |
| 2011/0001859 A1* | 1/2011 | Matsuura | H04N 5/3532 348/296 |
| 2011/0181754 A1* | 7/2011 | Iwasaki | H04N 5/353 348/230.1 |
| 2012/0069214 A1* | 3/2012 | Shiohara | 348/229.1 |
| 2013/0051700 A1* | 2/2013 | Jo | 382/284 |
| 2013/0128080 A1* | 5/2013 | Hsu | 348/234 |
| 2013/0235257 A1* | 9/2013 | Kaida et al. | 348/362 |

FOREIGN PATENT DOCUMENTS

| | | |
|---|---|---|
| JP | 2002-290829 A | 10/2002 |
| JP | 2003-078815 A | 3/2003 |
| JP | 2008-079209 A | 4/2008 |

* cited by examiner

*Primary Examiner* — Justin P Misleh
(74) *Attorney, Agent, or Firm* — Cowan, Liebowitz & Latman, P.C.

(57) ABSTRACT

An image processing apparatus which composes a plurality of images shot under different exposure conditions, comprises a detection unit which detects an exposure error according to a position on a screen using, out of the plurality of images shot under different exposure conditions, an image whose exposure amount is smaller than a predetermined value as a detection target image, a calculation unit which calculates correction information to correct the exposure error detected by the detection unit in accordance with the position on the screen, an adjustment unit which performs level adjustment according to the exposure amount of the detection target image in accordance with the correction information and position information on the screen, and an image composition unit which generates a composite image by composing the plurality of images including the image that has undergone the level adjustment.

10 Claims, 13 Drawing Sheets

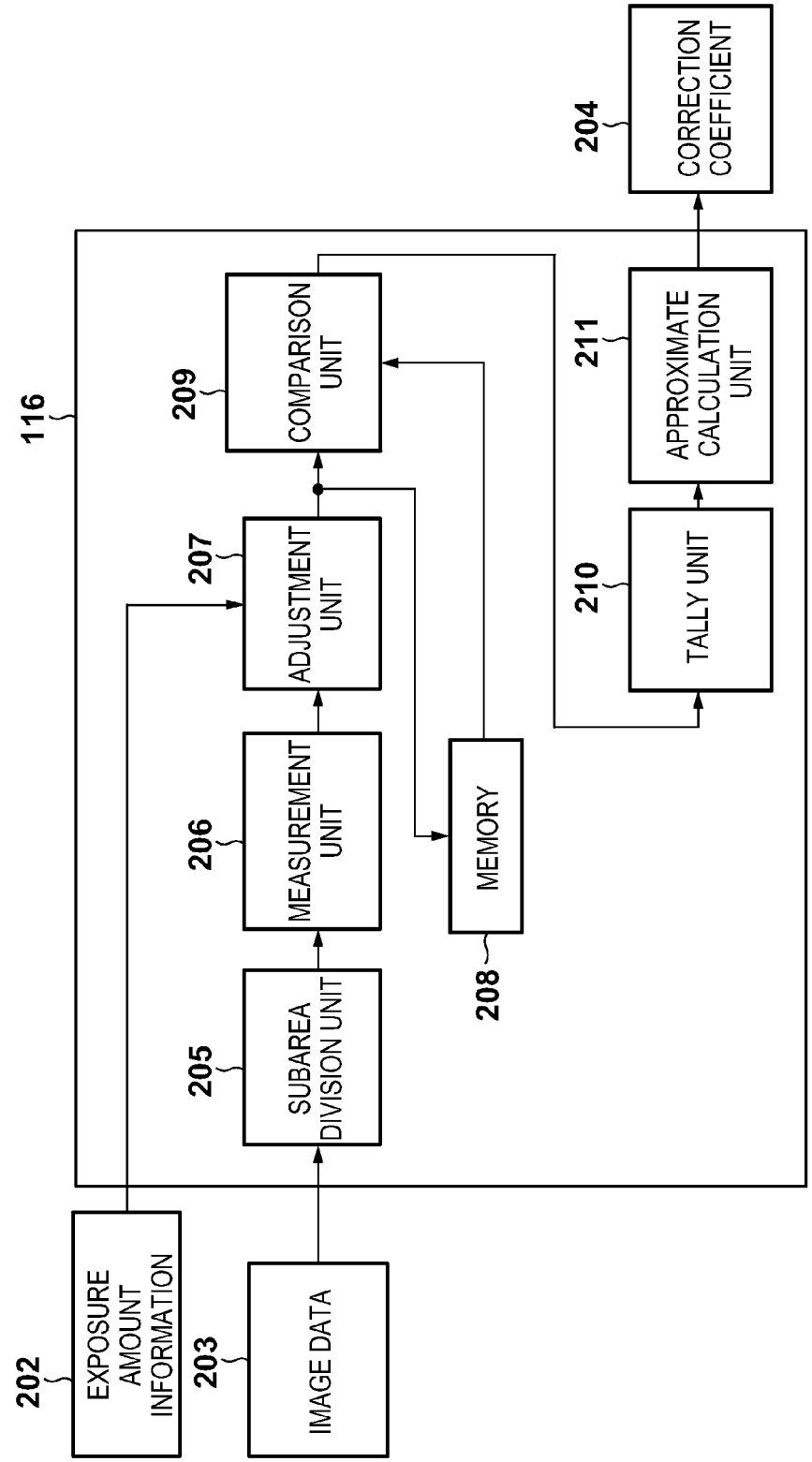

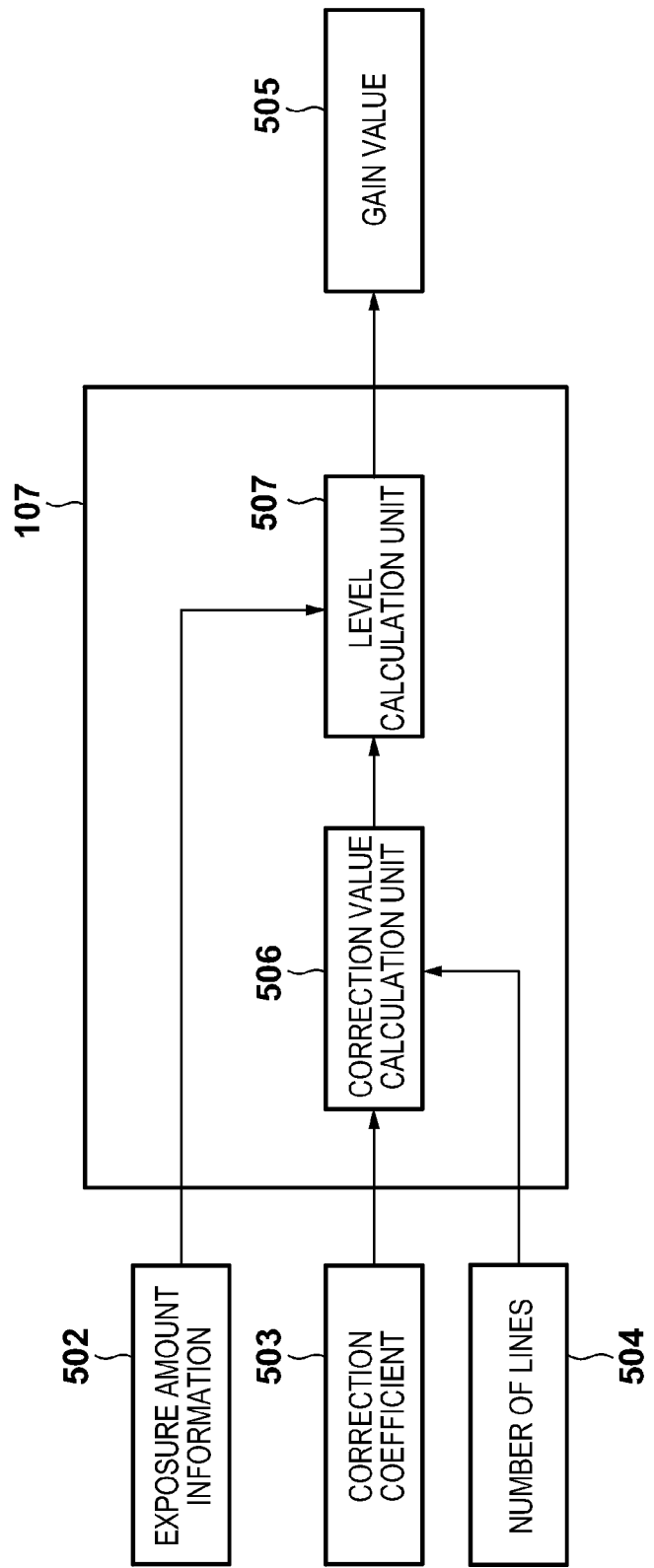

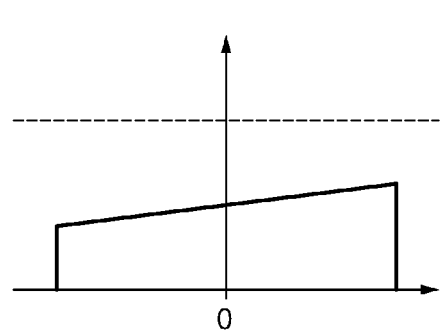
F I G. 6A
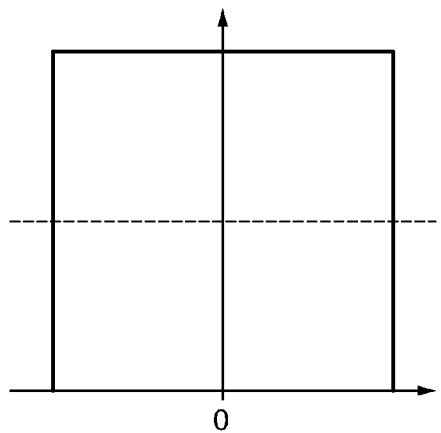
F I G. 6B
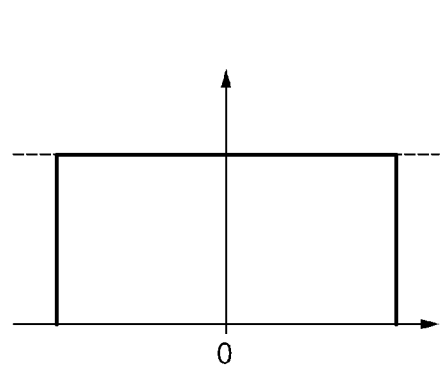
F I G. 6C
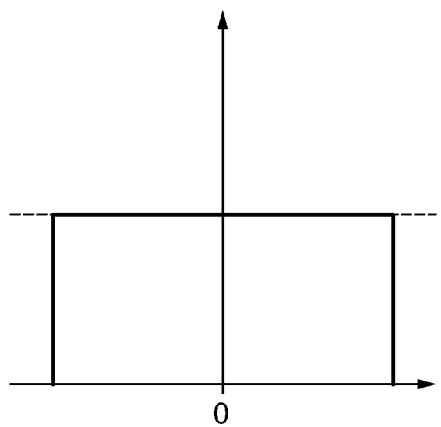
F I G. 6D

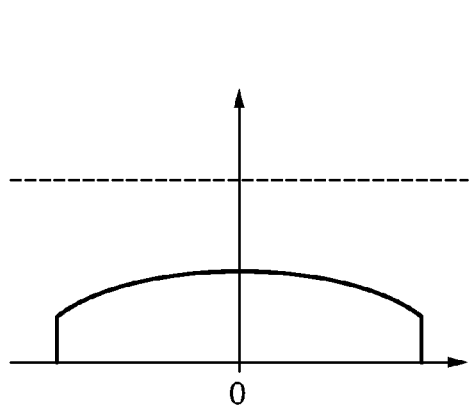
F I G. 12A
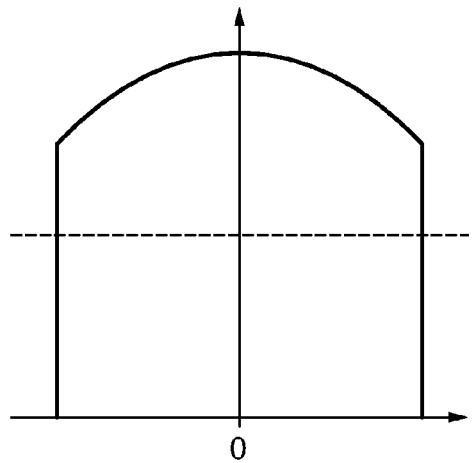
F I G. 12B
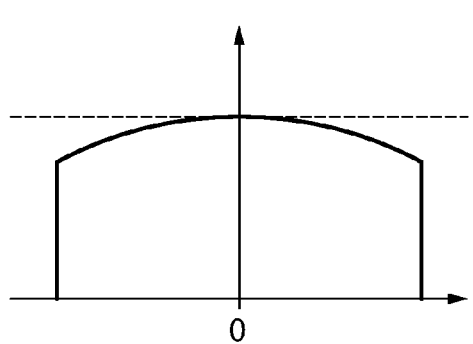
F I G. 12C
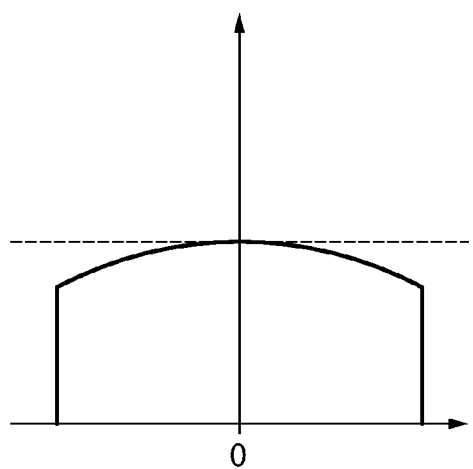
F I G. 12D

IMAGE PROCESSING APPARATUS WHICH COMPOSES A PLURALITY OF IMAGES SHOT UNDER DIFFERENT EXPOSURE CONDITIONS AND IMAGE PROCESSING METHOD

BACKGROUND OF THE INVENTION

1. Field of the Invention

The present invention relates to a technique of composing a plurality of images shot under different exposure conditions so as to generate an image having a wide dynamic range.

2. Description of the Related Art

There exists a method of shooting a plurality of images with little highlight-detail loss and images with little shadow-detail loss under different exposure conditions and composing the images to generate an image having a wide dynamic range. In this image composition processing, the images are composed after level adjustment according to exposure amounts has been performed between over-exposure images and under-exposure images.

A focal plane shutter that adjusts the exposure time using the traveling interval between the front curtain and the rear curtain is known to cause an exposure error when the traveling speed of the front curtain and that of the rear curtain have a difference (curtain speed unevenness), and the exposure time changes between the two ends of the screen. In particular, the curtain speed unevenness readily occurs at a high shutter speed. At a low shutter speed, the influence of the curtain speed unevenness is small. Japanese Patent Laid-Open No. 2003-078815 or 2008-079209 proposes a technique of correcting an exposure error caused by the curtain speed unevenness.

When controlling a lens or a stop, a phenomenon called shading is known in which the peripheral portion of an image becomes darker than the center. A technique of correcting the shading has also been proposed (for example, Japanese Patent Laid-Open No. 2002-290829).

When composing a plurality of images, an exposure error may occur according to the position on the screen due to the curtain speed unevenness or shading. Even when gain adjustment is done all over the screen, the level cannot match depending on the position on the screen, and a moving area may erroneously be detected.

FIG. 13 shows the configuration of a conventional apparatus. Reference numerals 1301 to 1305 and 1308 to 1315 correspond to reference numerals 101 to 105 and 108 to 115 in the first embodiment (FIG. 1) to be described later. The main functions will be described below assuming that, for example, the exposure amount setting unit 1303 sets the exposure step of under-exposure to −2 steps with respect to correct exposure and the exposure step of over-exposure to +2 steps with respect to correct exposure.

The level setting unit 1307 sets a 4-times level matching gain value in the level gain processing unit 1309 for under-exposure image data. Similarly, the level setting unit 1306 sets a ¼ level matching gain value in the level gain processing unit 1308 for over-exposure image data. The motion detection unit 1310 compares the under-exposure image data and the over-exposure image data, which have undergone the level matching, and detects motion information in the images.

FIGS. 14A to 14D show the pixel level distributions of shot images. The abscissa represents the position on the screen along the shutter traveling direction (normally, the vertical direction of the screen), and the ordinate represents the pixel level at that position. The dotted lines in FIGS. 14A to 14D indicate the pixel level of correct exposure.

FIG. 14A shows the pixel level distribution of an under-exposure image shot using a high-speed shutter, immediately after shooting. Since the image is an under-exposure image, the pixel level is lower than that of correct exposure and changes depending on the position on the screen because of the influence of curtain speed unevenness.

FIG. 14B shows the pixel level distribution of an over-exposure image shot using a low-speed shutter, immediately after shooting. Since the image is an over-exposure image, the pixel level is higher than that of correct exposure and constant at any position on the screen because there is little influence of curtain speed unevenness.

FIGS. 14C and 14D show results obtained by performing level matching according to the exposure amount to compose the under-exposure image and the over-exposure image. FIG. 14C shows the result of level matching of the under-exposure image. The pixel level is correct near the screen center but not at the two ends of the screen. FIG. 14D shows the result of level matching of the over-exposure image. The pixel level is correct all over the screen.

Conventional motion detection is performed based on the pixel level distributions shown in FIGS. 14C and 14D. The motion detection can normally be done near the screen center. However, since the pixel values have a difference between the two ends of the screen, a motionless area is erroneously detected as a moving area.

FIGS. 15A to 15D show the pixel level distributions of images with shading. The abscissa represents the distance from the screen center, and the ordinate represents the pixel level at that distance. The dotted lines in FIGS. 15A to 15D indicate the pixel level of correct exposure.

FIG. 15A shows the pixel level distribution of an under-exposure image shot in a stopped-down-aperture state, immediately after shooting. FIG. 15B shows the pixel level distribution of an over-exposure image shot in a full-aperture state, immediately after shooting. In both images, the pixel level decreases in accordance with the distance from the screen center due to the influence of shading. However, since the influence of shading changes in general depending on the f-number, the degree of decrease changes between FIGS. 15A and 15B.

FIGS. 15C and 15D show results obtained by performing level matching according to the exposure amount to compose the under-exposure image and the over-exposure image. In this case, the pixel level is correct near the screen center but not at the peripheral portion of the screen because of the different influence of shading. For this reason, motion detection can normally be done near the screen center. However, since the pixel values have a difference at the peripheral portion of the screen, a motionless area is erroneously detected as a moving area.

In Japanese Patent Laid-Open No. 2003-078815 or No. 2008-079209 described above, to detect curtain speed unevenness, a reference image such as a wall or white paper needs to be shot in advance. This is inadequate for correcting curtain speed unevenness in every shooting.

In Japanese Patent Laid-Open No. 2002-290829, a plurality of correction tables used for shading correction need to be prepared in accordance with the focal length or f-number at the time of shooting. This is not suitable for a single-lens reflex camera capable of variously exchanging the lens. In addition, since shading correction is performed for each of two shot images, processing is complicated.

SUMMARY OF THE INVENTION

The present invention has been made in consideration of the aforementioned problems, and provides an image processing technique capable of normally performing motion detection without necessity of complicated processing by composing a plurality of images shot under different exposure conditions after exposure error correction according to the position on the screen.

In order to solve the aforementioned problems, the present invention provides an image processing apparatus which composes a plurality of images shot under different exposure conditions, comprising: a detection unit configured to detect an exposure error according to a position on a screen using, out of the plurality of images shot under different exposure conditions, an image whose exposure amount is smaller than a predetermined value as a detection target image; a calculation unit configured to calculate correction information to correct the exposure error detected by the detection unit in accordance with the position on the screen; an adjustment unit configured to perform level adjustment according to the exposure amount of the detection target image in accordance with the correction information and position information on the screen; and an image composition unit configured to generate a composite image by composing the plurality of images including the image that has undergone the level adjustment.

In order to solve the aforementioned problems, the present invention provides an image processing method of composing a plurality of images shot under different exposure conditions, the method comprising: a detection step of detecting an exposure error according to a position on a screen using, out of the plurality of images shot under different exposure conditions, an image whose exposure amount is smaller than a predetermined value as a detection target image; a calculation step of calculating correction information to correct the exposure error detected in the detection step in accordance with the position on the screen; an adjustment step of performing level adjustment according to the exposure amount of the detection target image in accordance with the correction information and position information on the screen; and an image composition step of generating a composite image by composing the plurality of images including the image that has undergone the level adjustment.

According to the present invention, it is possible to normally perform motion detection without necessity of complicated processing by composing a plurality of images shot under different exposure conditions after exposure error correction according to the position on the screen.

Further features of the present invention will become apparent from the following description of exemplary embodiments (with reference to the attached drawings).

BRIEF DESCRIPTION OF THE DRAWINGS

FIG. 2 is a block diagram showing the configuration of an exposure error detection unit shown in FIG. 1;

FIG. 5 is a block diagram showing the configuration of a level setting unit shown in FIG. 1;

FIGS. 6A to 6D are views for explaining level adjustment processing according to the first embodiment;

FIGS. 12A to 12D are views for explaining level adjustment processing according to the second embodiment;

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

Correction processing of an exposure error caused by the curtain speed unevenness of a focal plane shutter according to the first embodiment will be described with reference to FIGS. 1 to 6.

<Apparatus Configuration>

An embodiment will be described in which an image processing apparatus of the present invention is applied to, for example, an image capturing apparatus such as a digital camera that shoots an image.

The configuration and functionality of the image capturing apparatus according to this embodiment will be described with reference to FIG. 1.

Figure 1:
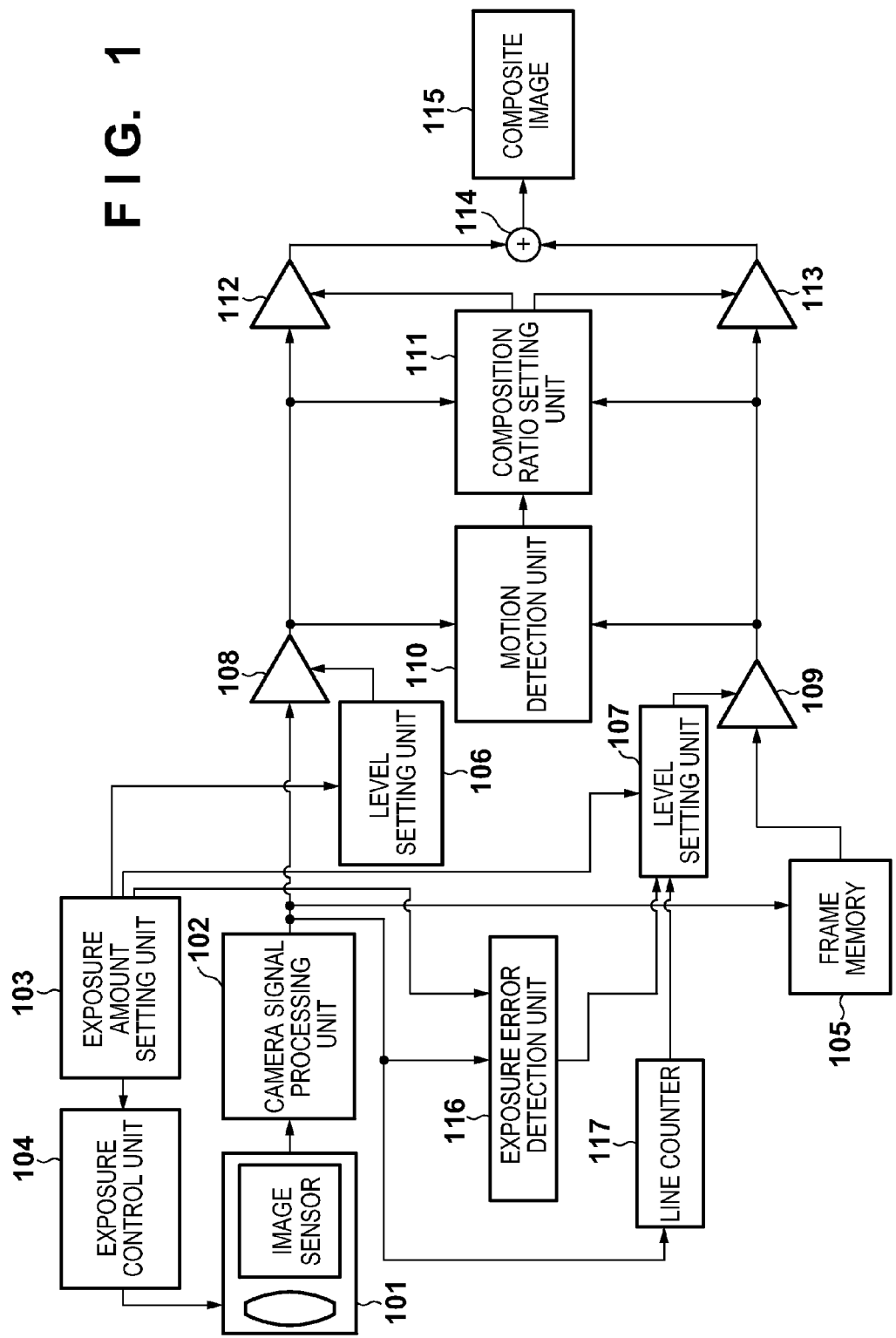
FIG. 1 is a block diagram showing the configuration of an apparatus according to the first embodiment.

Referring to FIG. 1, a photographing unit 101 includes a lens, a stop, an image sensor, and a sensor gain unit, and outputs a shot image as an image signal. A camera signal processing unit 102 generates a luminance signal and chrominance signals from the image signal. In this case, the luminance signal indicates a luminance signal (Y) converted from R, G, and B chrominance signals. However, each of the R, G, and B chrominance signals also solely has the information of brightness of the image and can therefore be used in place of the luminance signal. For the sake of simplicity of the description, these data having the brightness information will be referred to as image data together. An exposure amount setting unit 103 sets the exposure amount at the time of shooting. An exposure control unit 104 controls the exposure amount of the photographing unit 101 in accordance with the exposure amount information from the exposure amount setting unit 103. A frame memory 105 temporarily stores shot image data. A level setting unit 106 sets, based on the exposure amount information from the exposure amount setting unit 103, a level matching gain for level matching to be performed for the image data. A level setting unit 107 sets a level matching gain corresponding to the number of lines in the vertical direction based on correction information from an exposure error detection unit 116 and position information (number of lines) from a line counter 117 as well as the exposure amount information from the exposure amount setting unit 103. A level gain processing unit 108 adjusts the level of over-exposure image data in a predetermined exposure amount or more in accordance with the set value of the level setting unit 106. A level gain processing unit 109 adjusts the level of under-exposure image data in not more than the predetermined exposure amount in accordance with the information from the level setting unit 107. A motion detection unit 110 detects motion information in the images by obtaining, for example, difference information between the two image data that have undergone the level matching by the level gain processing units 108 and 109. A composition ratio setting unit 111 sets the composition ratio to compose the two image data. Composition ratio adjustment units 112 and 113 adjust the image composition ratio in accordance with the set value from the composition ratio setting unit 111. An image composition unit 114 adds the two image data multiplied by the composition ratio, thereby generating composite image data 115. The exposure error detection unit 116 compares the under-exposure image data as a detection target image with the over-exposure image data to detect an exposure error according to the position on the screen, and calculates correction information to correct the detected exposure error, as will be described later. The line counter 117 defects, for the image data currently under composition processing, the number of lines in the vertical direction, that is, in the traveling direction of the focal plane shutter.

The motion detection unit 110 compares under-exposure image data and over-exposure image data which have undergone level matching by the level setting units 106 and 107 and detects motion information in the images. For example, the under-exposure image data and the over-exposure image data are divided into predetermined areas. The difference between the areas is obtained. If the absolute value of the difference value is large, the area is determined as a moving area.

The composition ratio setting unit 111 sets the composition ratio based on the luminance information or motion information of image data. More specifically, for a bright portion of an image, the composition ratio is set so as to mainly compose the under-exposure image data. For a dark portion of the image, the composition ratio is set so as to mainly compose the over-exposure image data. For an area determined as a moving area, the composition ratio is set so as to output one of the under-exposure image data and the over-exposure image data. One of the image data is output, thereby avoiding image quality degradation such as a blur of the moving area in the composite image data.

A case will be explained below in which the under-exposure image is shot first, and the over-exposure image data is shot next and composed. However, the shooting order of the under-exposure image and the over-exposure image can be reversed when a frame memory for saving shot images is used.

In this embodiment, the under-exposure image serves as a detection target image and undergoes level matching including exposure error correction, and the over-exposure image undergoes level matching as before. This is because an exposure error caused by curtain speed unevenness according to the position on the screen more conspicuously appears in the under-exposure image. That is, the curtain speed unevenness generally occurs in both a high-speed shutter and a low-speed shutter. However, since the difference in exposure time generated by curtain speed unevenness has a predetermined value, the influence of the exposure error is small in the low-speed shutter (over-exposure side) with a long exposure time, and the influence of the exposure error is large in the high-speed shutter (under-exposure side) with a short exposure time. Hence, only the image data (under-exposure image data) on the high-speed shutter side is corrected as detection target image data.

The configuration and functionality of the exposure error detection unit 116 shown in FIG. 1 will be described next with reference to FIGS. 2, 3A, and 3B.

Referring to FIG. 2, exposure amount information 202 is obtained from the exposure amount setting unit 103. Image data 203 has luminance information. A correction coefficient 204 is correction information detected by the exposure error detection unit 116 to correct an exposure error. The procedure of causing the exposure error detection unit 116 of this embodiment to calculate the correction coefficient 204 from the image data 203 will be described below.

Figure 3A:
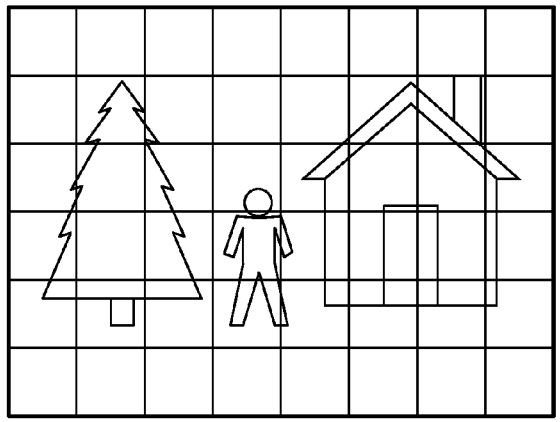
FIGS. 3A and 3B are views showing subarea division of an image and a tally result according to the first embodiment.
Figure 3B:
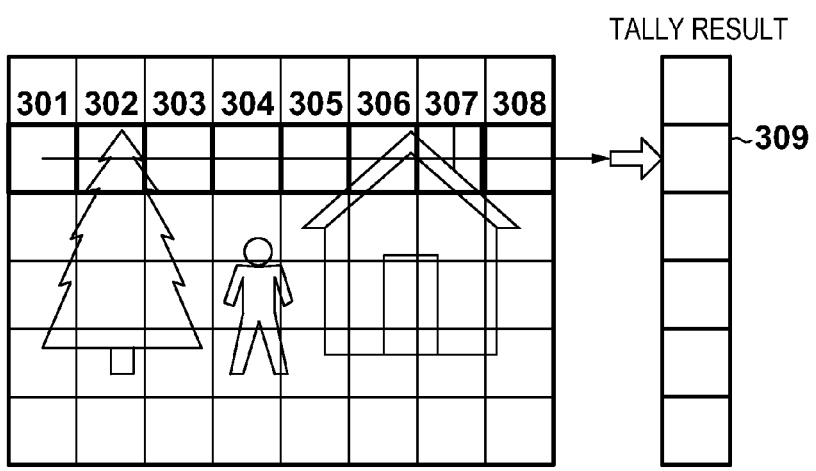

A subarea division unit 205 divides the image data 203 into subareas, as shown in FIG. 3A. FIG. 3A shows an example in which the image data is divided into 6 rows in the vertical direction×8 columns in the horizontal direction. A measurement unit 206 performs measurement in each subarea of the divided image data, and obtains a measurement value of each subarea. The measurement value is, for example, the average value of luminance values in each subarea. Note that the measurement value need only represent the luminance value in each subarea, and another value such as a peak value may be used in place of the average value. An adjustment unit 207 adjusts the level of the measurement value of each subarea using the exposure amount information 202. For example, assume that the exposure amount information defines ¼ of correct exposure for an under-exposure image and 4-times of correct exposure for an over-exposure image. In this case, the measurement value of the under-exposure image is multiplied by 4, and the measurement value of the over-exposure image is multiplied by ¼, thereby adjusting the levels to remove portions by the exposure amount difference from the measurement values.

Out of the measurement values of the under-exposure image and the over-exposure image obtained on the subarea basis, a result measured first is temporarily stored in a memory 208. For example, when the under-exposure image is measured first, the measurement value is stored in the memory 208. Next, a comparison unit 209 compares the measurement values of the under-exposure image and the over-exposure image for each subarea. According to the above-described order, the measurement value of the under-exposure image having undergone level adjustment first and stored in the memory 208 and the measurement value of the over-exposure image having undergone level adjustment next are compared. The comparison is done by division of measurement values corresponding to subareas at the same position of the images. For example, let RL be the measurement value of the subarea at a given position of the under-exposure image, and RH be the measurement value of the subarea at the same position of the over-exposure image. A comparison value M is obtained by $$M=(RL)/(RH) \quad (1)$$

Each measurement value is a value that has undergone exposure amount adjustment by the adjustment unit 207. Hence, the calculation result has a value of about 1.0, which facilitates tally and approximate calculation to be described below. Note that the comparison here need only obtain a comparison result representing the exposure error between the under-exposure image and the over-exposure image, and for example, the difference between adjustment results may be obtained on the subarea basis.

The comparison results obtained on the subarea basis are tallied by a tally unit 210 in accordance with the position of each subarea on the screen. In this embodiment, to obtain the exposure error caused by the curtain speed unevenness of the focal plane shutter, tally is performed in correspondence with the traveling direction of the shutter. That is, to obtain the exposure error distributed in the vertical direction, measurement values at the same vertical position are tallied. This state will be explained with reference to FIG. 3B. FIG. 3B shows an example in which the image data is divided into 6 rows in the vertical direction×8 columns in the horizontal direction. Hence, six tally results are obtained in accordance with the number of subareas in the vertical direction. For example, to obtain the tally result of subareas located on the second row indicated by the thick lines in FIG. 3B, an average value 309 is obtained for eight comparison results of eight subareas 301 to 308 located on the second row. Note that the tally need only obtain a tally result representing the comparison result of each row. For example, the average value may be obtained using only some of the eight comparison values, or the median of the eight comparison values may be obtained as the tally result. This processing is performed for all subareas, and tally results each of which associates the vertical position with the average value are obtained. An approximate calculation unit 211 performs approximate calculation of the obtained tally results and calculates the correction coefficient 204.

Figure 4:
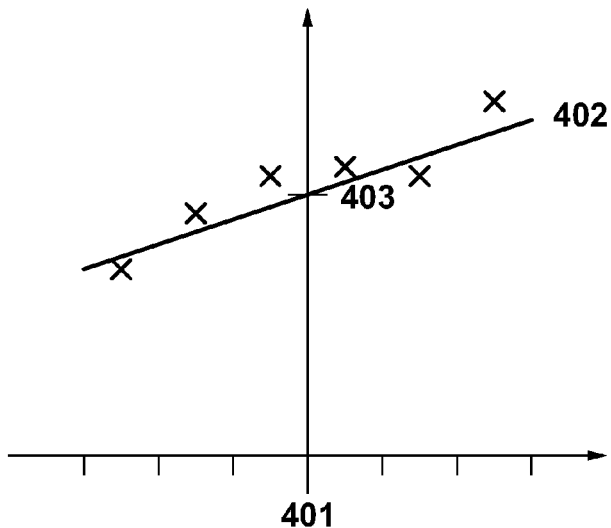
FIG. 4 is a graph showing the tally result and an approximate line according to the first embodiment.

FIG. 4 shows a method of obtaining an approximate line from the tally result. The abscissa represents the vertical position of the image, and the ordinate represents the value of the tally result. On the abscissa, 401 indicates the center of the image. Each point X in FIG. 4 indicates a tally result. The approximate calculation unit 211 obtains, from the tally results, an approximate line 402 representing the tally results best. The approximate line can be obtained from the tally results using, for example, the least squares method. This approximate line indicates the exposure amount difference generated in the vertical direction of the image as the comparison result of the under-exposure image and the over-exposure image. That is, the approximate line indicates the exposure amount difference generated by the curtain speed unevenness of the focal plane shutter. Hence, the correction coefficient 204 is represented by the slope of the approximate line and the intercept to the image center position. Note that as the coefficient represented by the approximate line, a different indicator may be calculated depending on how to take the coordinate values. The approximate line may be obtained using not the line but the order of a quadratic expression or more.

Note that when the measurement value of each subarea is adjusted based on the exposure amount information 202, and comparison of the image data 203 is done by division, an intercept 403 of the approximate line to the image center position serves as an index to know the degree of accuracy of the approximation because the value is about 1.0 independently of the actual exposure amount of each image. For example, when the adjustment is not done based on the exposure amount information 202, and the exposure amount difference between the under-exposure image and the over-exposure image is 1/16, the intercept 403 to the image center position has a small value of about 0.06. On the other hand, if the exposure amount difference between the under-exposure image and the over-exposure image is 1/2, the intercept 403 has a value of about 0.5 that is largely different from the above-described value. When the adjustment is performed based on the exposure amount information 202, the intercept 403 takes a value of about 1.0. If the value is greatly different from 1.0, it can easily be determined that the approximation is incorrect. That is, when the coefficient representing the approximate line falls outside a specific range (for example, the intercept to the image center position is 0.9 to 1.1), it can be determined that the exposure error could not appropriately be detected. Whether to correct the exposure error in processing later can easily be determined in accordance with the determination result. This makes it possible to take a safe measure such as prohibiting inappropriate exposure error correction.

The procedure of causing the level setting unit 107 to set a level to correct an exposure error from the correction coefficient 204 calculated by the exposure error detection unit 116 will be described next with reference to FIG. 5.

Referring to FIG. 5, exposure amount information 502 is obtained from the exposure amount setting unit 103. A correction coefficient 503 is calculated by the exposure error detection unit 116. The number 504 of lines is generated by the line counter 117 and represents the number of lines in the vertical direction of the image to be composed. A level matching gain value 505 is calculated by the level setting unit 107.

First, a correction value calculation unit 506 calculates the correction value of the exposure error from the correction coefficient 503 and the number 504 of lines. As described with reference to FIG. 2, when the exposure error is represented by the approximate line, the correction coefficient 503 is represented by a slope a of the line and an intercept b to the image center position. Let N be the number of vertical lines of the entire image, and X be the current number of lines. A correction value z is given by $$z = 1/(a \times (X - N/2) + b) \quad (2)$$

Next, a level calculation unit 507 multiplies the result by the exposure amount information 502, thereby calculating the level matching gain value 505. Letting E be the exposure amount, a level matching gain value G is given by $$G = E \times z \quad (3)$$

The level matching gain value 505 calculated by the level setting unit of this embodiment is sent to the level gain processing unit 109 shown in FIG. 1, and level matching of the under-exposure image data is performed. The level matching gain value 505 changes between the vertical lines of the image data, and changes to correct the exposure error in accordance with the position on the screen. That is, level matching including exposure error correction is performed for the under-exposure image data.

Figure 14A:
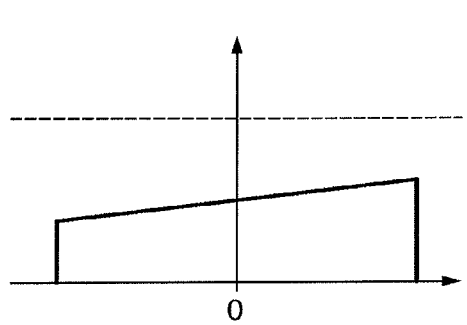
FIGS. 14A to 14D are views showing exposure errors caused by the curtain speed unevenness of a conventional focal plane shutter.
Figure 14B:
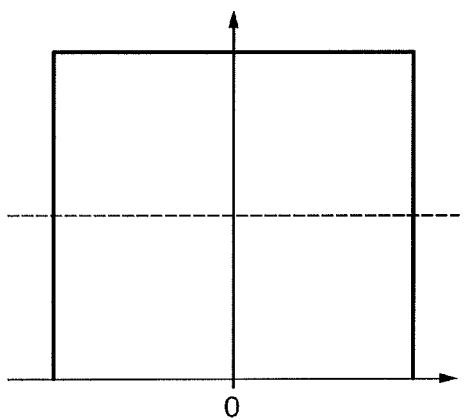
Figure 14C:
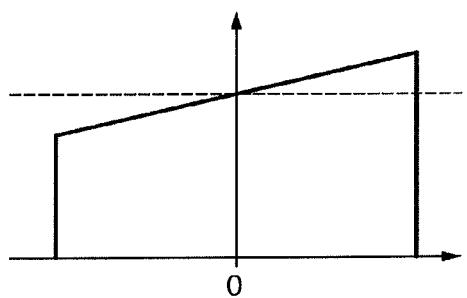
Figure 14D:
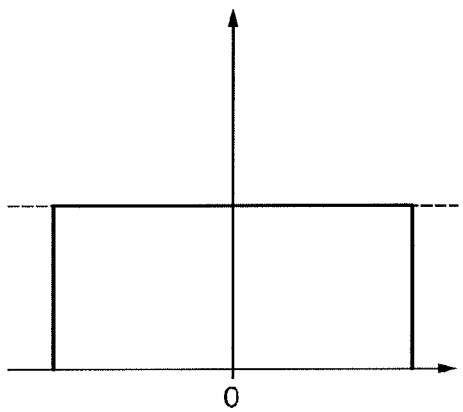

FIGS. 6A to 6D show pixel level distributions when the level matching including exposure error correction information is performed. FIG. 6A shows the pixel level distribution of an under-exposure image shot using a high-speed shutter, immediately after shooting, and corresponds to FIG. 14A. Similarly, FIG. 6B shows the pixel level distribution of an over-exposure image shot using a low-speed shutter, immediately after shooting, and corresponds to FIG. 14B. For the over-exposure image, level matching as before is performed. Hence, a pixel level as shown in FIG. 6D is obtained as the pixel level after level matching, which corresponds to FIG. 14D. On the other hand, for the under-exposure image, level matching including exposure error correction is performed. That is, level matching is performed such that the difference in the pixel level shown in FIG. 6A, which changes depending on the position on the screen, is corrected. For this reason, a uniform pixel level is obtained in the screen after the level matching, as shown in FIG. 6C.

As a result, the pixel level of the under-exposure image matches that of the over-exposure image all over the screen. Motion detection shown in FIG. 1 and the like can normally be performed at any position on the screen.

As described above, according to this embodiment, an exposure error according to the position on the screen is detected and corrected, thereby normally performing motion detection when composing a plurality of images shot under different exposure conditions.

Note that in this embodiment, the comparison value is obtained by equation (1). Instead of using equation (1), a comparison value M' may be obtained by changing the order of division operation by $$M'=(RH)/(RL) \quad (4)$$

Let c be the slope of the obtained approximate line, and d be the intercept to the image center position. A correction value z' and the level matching gain value G are respectively obtained by $$z'=d\times(X-N/2)+e) \quad (5)$$

$$G=E\times z' \quad (6)$$

In this embodiment, composing two images, that is, an under-exposure image and an over-exposure image, has been described. However, the present invention is not limited to this and is also applicable to composing three or more images. In this case, the image corresponding to the under-exposure image of this embodiment is an image in which the curtain speed unevenness of the shutter conspicuously appears, that is, each image shot at a speed higher than a predetermined shutter speed. The image undergoes exposure error detection and level matching including exposure error correction. Similarly, as the image corresponding to the over-exposure image, an image shot at a speed lower than the predetermined shutter speed is used for exposure error detection. If there are a plurality of images shot under the same conditions, exposure error detection may be performed using one of them. Alternatively, after the exposure amounts of the plurality of images under the same conditions are adjusted by the adjustment unit 207 in FIG. 2, exposure error detection may be performed using an averaged measurement value. In this embodiment, the adjustment unit performs the exposure amount in advance. It is therefore easy to obtain the average value of the measurement values from the plurality of images and perform exposure error detection.

Additionally, in this embodiment, the exposure error detection unit 116 performs processing for each input image. However, since the exposure error according to the position on the screen is caused by a mechanical factor, each shutter speed of the reference image and the correction value for each set exposure amount may be stored in another table. In this case, the same effect as described above can be obtained by reading out the correction value from the table at the time of shooting and performing only the level adjustment according to the position on the screen.

The same effect as described above can also be obtained by causing the exposure error detection unit 116 to perform processing only at a predetermined timing and updating the correction value stored in the table in consideration of aging.

Note that the above-described predetermined timing can be either the first shooting time at the time of activation after a predetermined period or the first shooting time after lens exchange in a lens-interchangeable image capturing apparatus.

Second Embodiment

Correction processing of an exposure error caused by shading according to the second embodiment will be described next with reference to FIGS. 7 to 12. That is, in the first embodiment, the exposure error caused by the curtain speed unevenness of the shutter, which is the correction target, occurs along one direction of the screen. In the second embodiment, however, the exposure error occurs in the vertical direction and horizontal direction of the screen. An exposure error that changes depending on the distance from the screen center will particularly be explained as a correction target. Note that the influence of shading occurs in both an under-exposure image and an over-exposure image. For this reason, in this embodiment, instead of correcting shading caused in each image, the pixel level difference in the peripheral portion caused by shading is corrected for only one of the under-exposure image and the over-exposure image. Properly speaking, the difference of influence of shading is corrected, though it will be referred to as an exposure error for the descriptive convenience.

Figure 7:
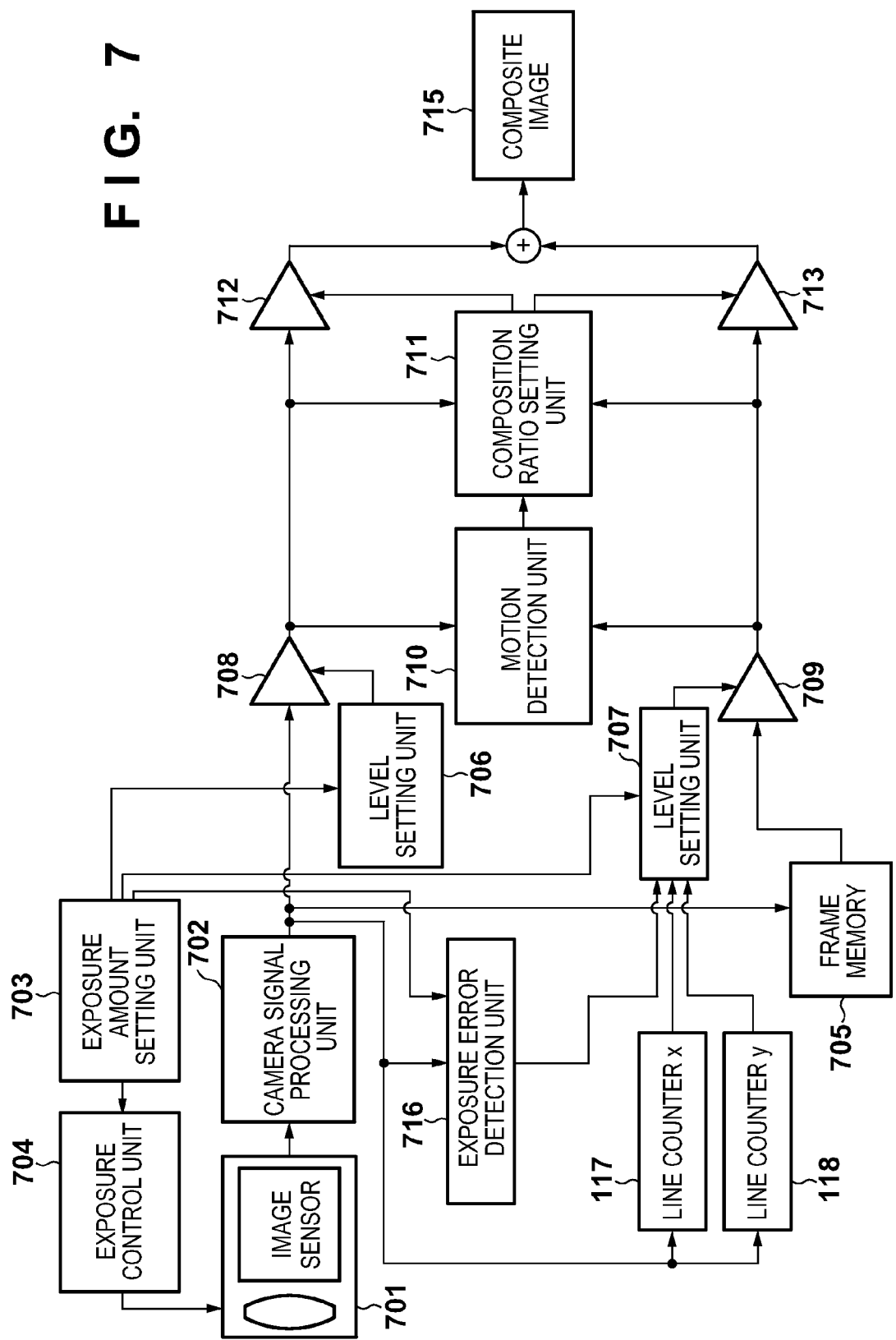
FIG. 7 is a block diagram showing the configuration of an apparatus according to the second embodiment.

In FIG. 7 illustrating the configuration of an apparatus according to this embodiment, units 701 to 706 and 708 to 715 correspond to the units 101 to 106 and 108 to 115 of the first embodiment (FIG. 1), respectively, and have the same functions as in the first embodiment.

An error exposure detection unit 716 of this embodiment detects an exposure error from an under-exposure image and an over-exposure image and calculates correction information, as will be described later. Line counters 717 and 718 detect the number of lines in the vertical direction (x direction) of the screen and the number of lines in the horizontal direction (y direction) of the screen, respectively, for image data currently under composition processing. The level setting unit 707 sets a level matching gain value corresponding to the numbers of lines in the vertical and horizontal directions based on correction information from the error exposure detection unit 716 and position information (numbers of lines) from the line counters 717 and 718 as well as the exposure amount information from the exposure amount setting unit 703.

An explanation will be made below assuming that the under-exposure image serves as a detection target image and undergoes level matching including exposure error correction, and the over-exposure image undergoes conventional level matching. However, the same effect can be obtained even when the over-exposure image serves as the detection target image, and the under-exposure image undergoes conventional level matching.

The configuration and functionality of the exposure error detection unit 716 shown in FIG. 7 will be described next with reference to FIGS. 8 and 9.

Figure 8:
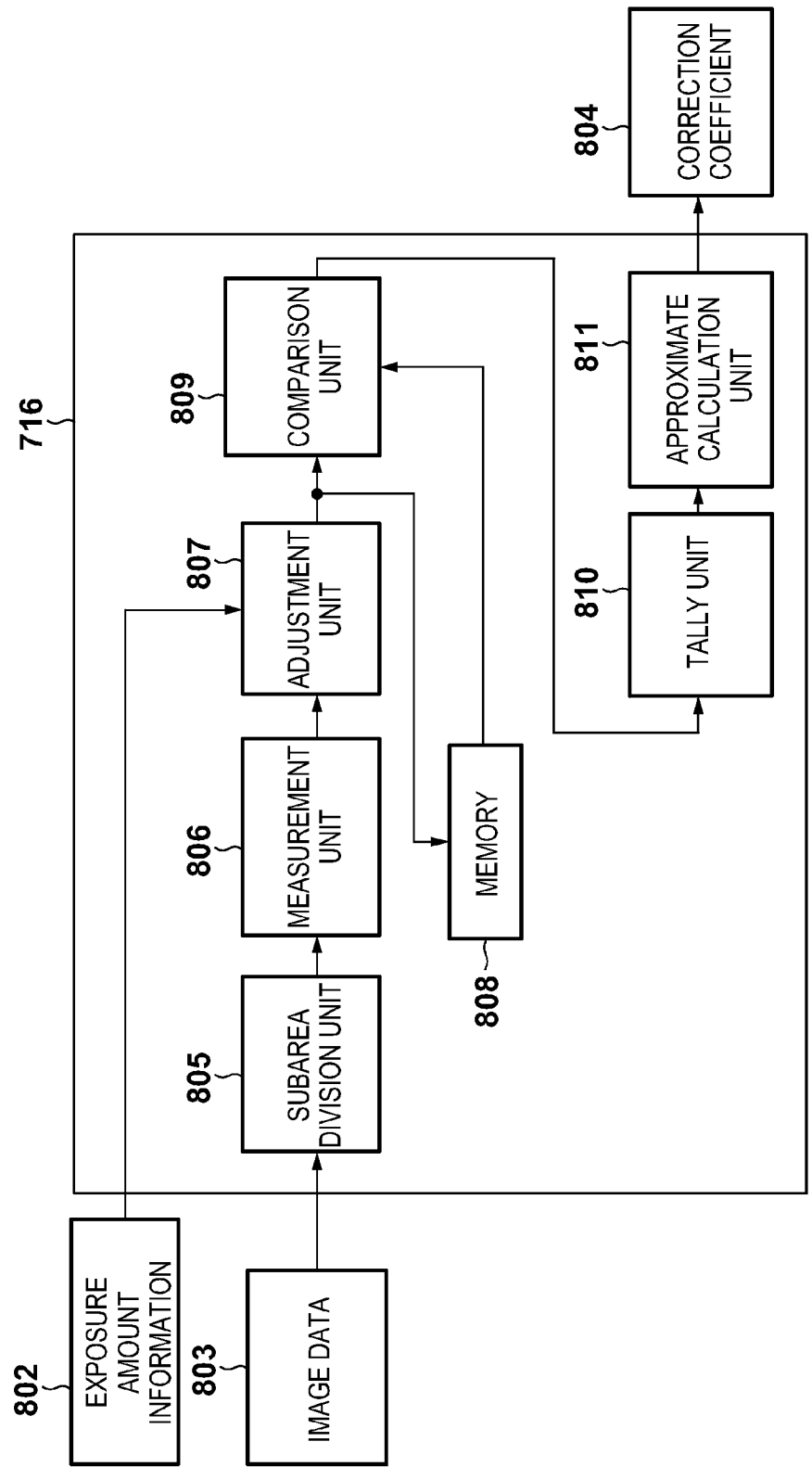
FIG. 8 is a block diagram showing the configuration of an exposure error detection unit shown in FIG. 7.
Figure 9:
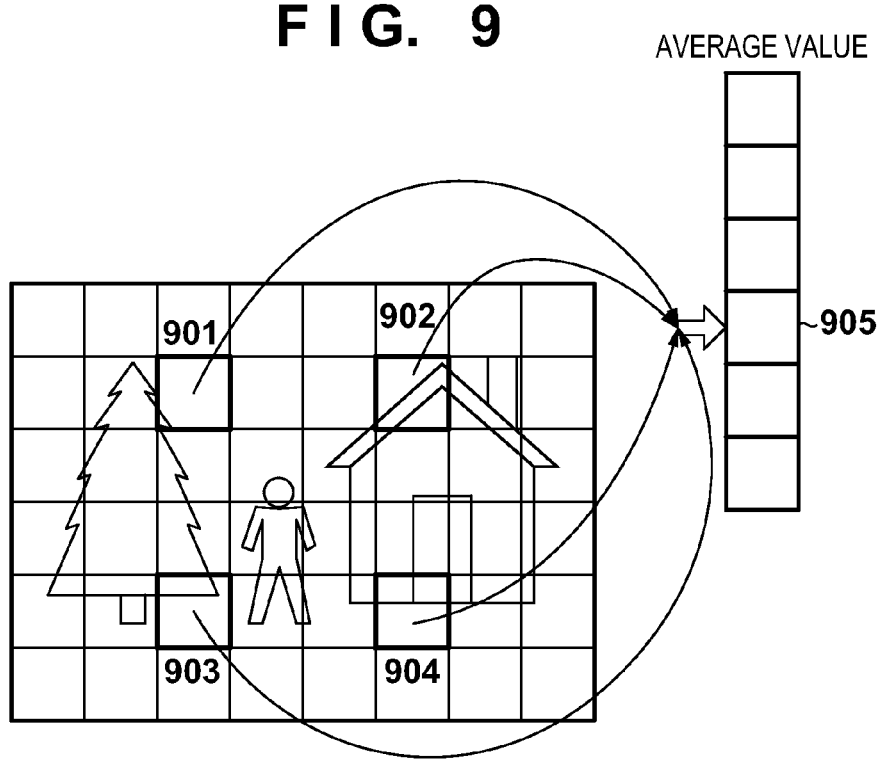
FIG. 9 is a view showing a tally result of an image according to the second embodiment.

Referring to FIG. 8, exposure amount information 802 is obtained from the exposure amount setting unit 703. Image data 803 has luminance information. A correction coefficient 804 is correction information detected by the exposure error detection unit 716 to correct an exposure error. The procedure of causing the exposure error detection unit 716 of this embodiment to calculate the correction coefficient 804 from the image data 803 will be described below.

In FIG. 8 illustrating the configuration of the error exposure detection unit 716 according to this embodiment, units 805 to 809 correspond to the units 205 to 209 of the first embodiment (FIG. 2), respectively, and have the same functions as in the first embodiment. Subarea division of this embodiment can be the same as in FIG. 3A.

The comparison results obtained by the comparison unit 809 on the subarea basis are tallied by a tally unit 810 in accordance with the position of each subarea on the screen. In this embodiment, to obtain the exposure error caused by shading, tally is performed in accordance with the distance from the screen center. That is, measurement values at an equidistance from the screen center are tallied. This state of tally will be explained with reference to FIG. 9. In FIG. 9, 901 to 904 indicate examples of four subareas at equidistant positions from the screen center. An average value 905 is obtained for the four comparison results of the four subareas at this distance. This processing is performed for all subareas, and tally results each of which associates the distance with the average value are obtained. An approximate calculation unit 811 performs approximate calculation of the obtained tally results and calculates the correction coefficient 804.

Figure 10:
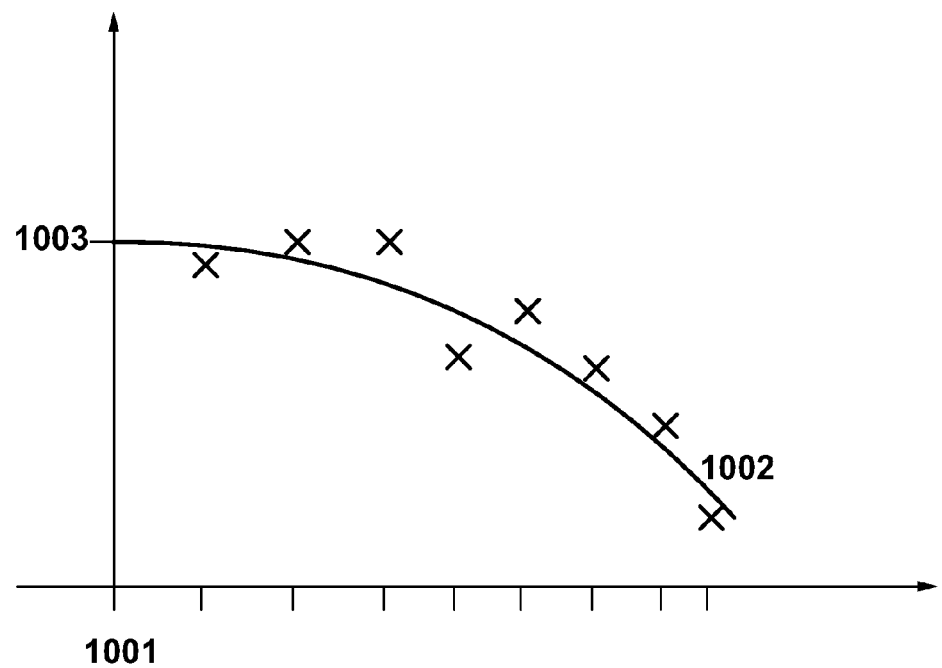
FIG. 10 is a graph showing the tally result and an approximate line according to the second embodiment.

FIG. 10 shows a method of obtaining an approximate line from the tally result. The abscissa represents the distance from the screen center, and the ordinate represents the value of the tally result. On the abscissa, 1001 indicates the center of the image. Each point X in FIG. 10 indicates a tally result. The approximate calculation unit 811 obtains, from the tally results, an approximate line 1002 representing the tally results best. The approximate line can be obtained as the coefficients of a polynomial expression from the tally results using, for example, the least squares method. This approximate line indicates the exposure amount difference generated in accordance with the distance from the screen center as the comparison result of the under-exposure image and the over-exposure image. That is, the approximate line indicates the exposure amount difference generated by shading. Hence, the correction coefficient 804 is represented by the coefficients of the polynomial expression indicating the approximate line. The order of the polynomial changes depending on the degree of shading as the correction target. Normally, a polynomial expression such as a fourth-order equation is used.

Note that when the measurement value of each subarea is adjusted based on the exposure amount information 802, and comparison of the image data 803 is done by division, an intercept 1003 of the approximate line to the image center position has a value of about 1.0 independently of the actual exposure amount of each image, as in the first embodiment.

The procedure of causing the level setting unit 707 to set a level to correct an exposure error from the correction coefficient 804 calculated by the exposure error detection unit 716 will be described next with reference to FIG. 11.

Figure 11:
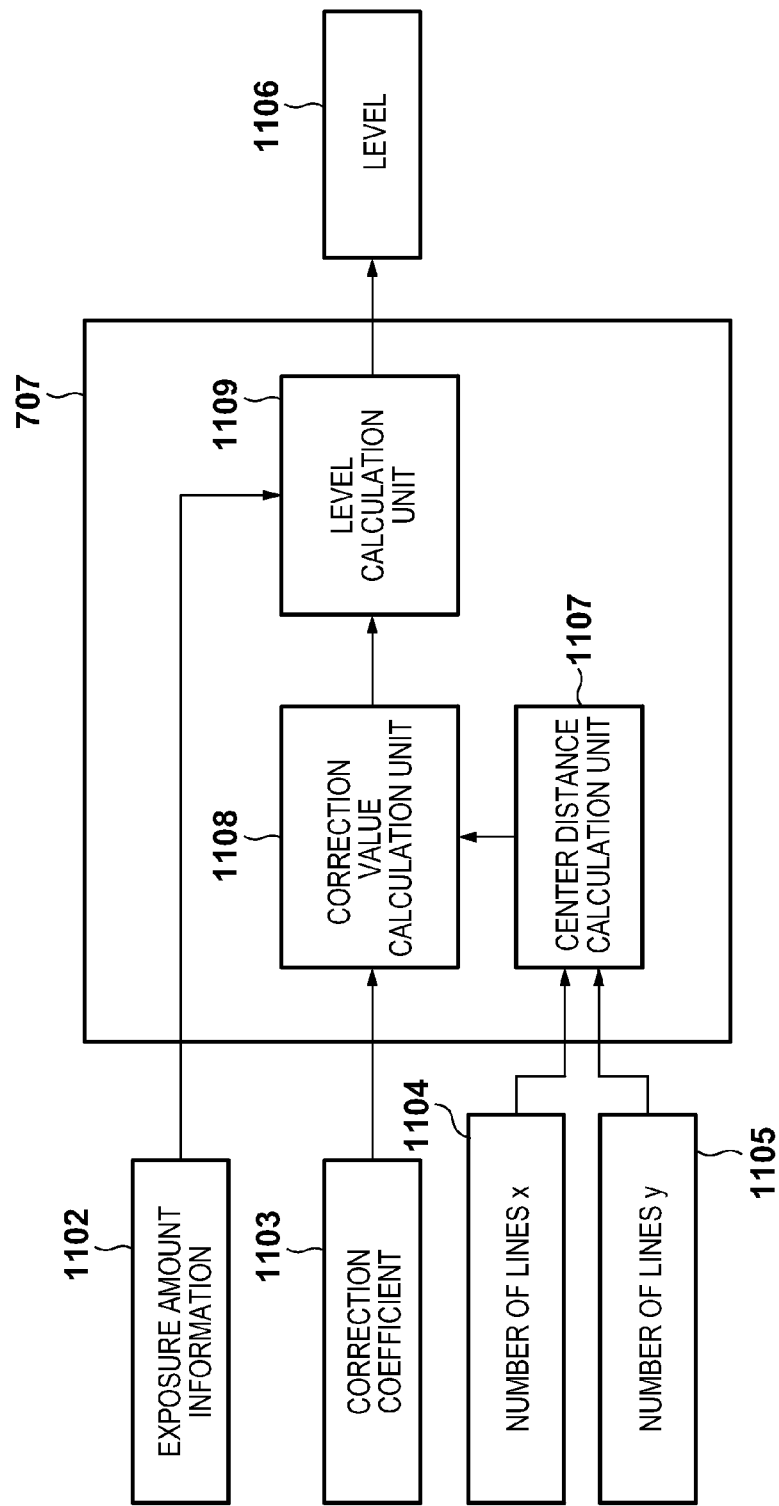
FIG. 11 is a block diagram showing the configuration of a level setting unit according to the second embodiment.
Figure 13:
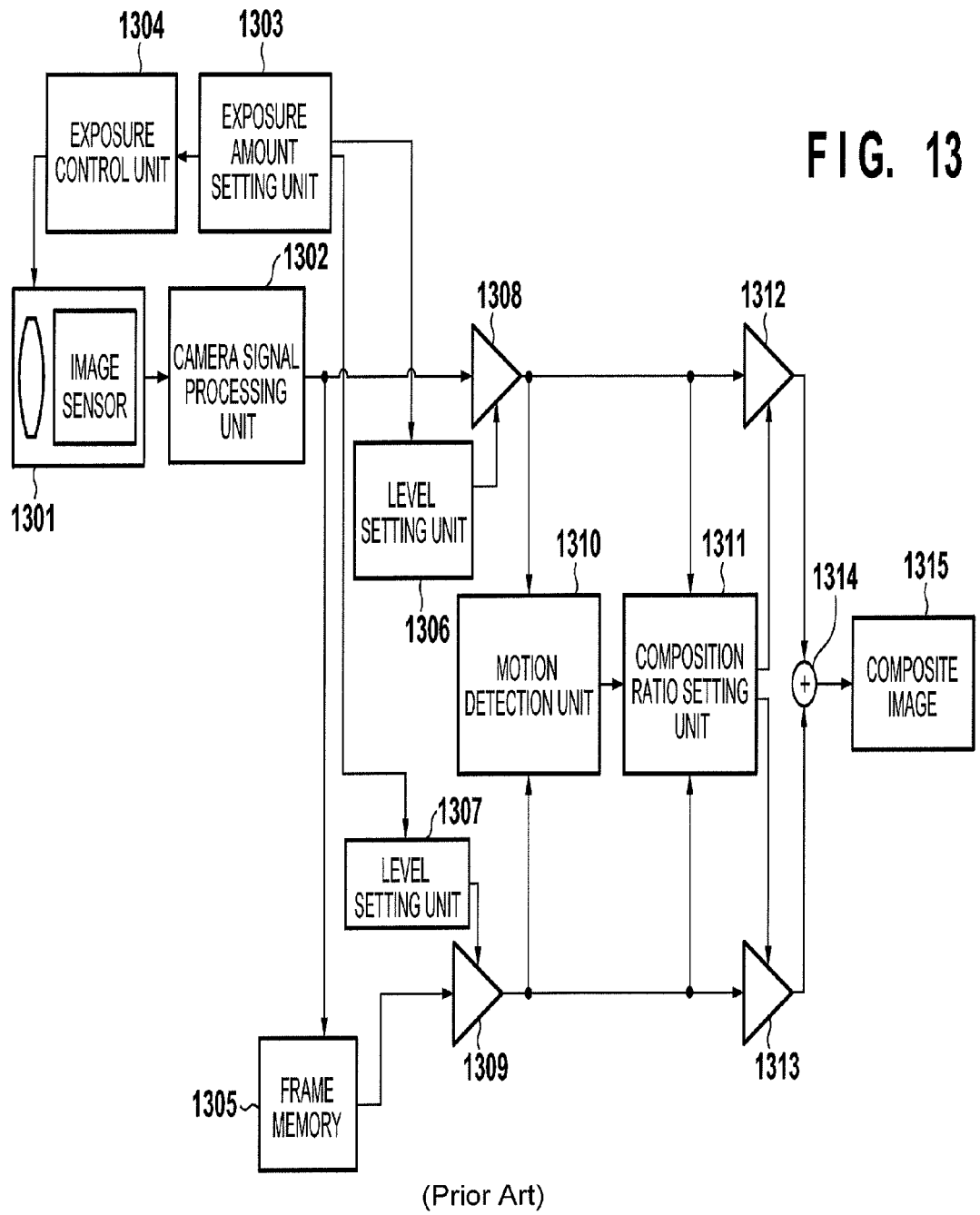
FIG. 13 is a block diagram showing the configuration of a conventional apparatus.

Referring to FIG. 11, exposure amount information 1102 is obtained from the exposure amount setting unit 703. A correction coefficient 1103 is calculated by the exposure error detection unit 716. The number 1104 of vertical lines is generated by the line counter 717 and represents the number of lines in the vertical direction (x direction) of the image to be composed. The number 1105 of horizontal lines is generated by the line counter 718 and represents the number of lines in the horizontal direction (y direction) of the image to be composed. A level matching gain value 1106 is calculated by the level setting unit 707.

First, a center distance calculation unit 1107 calculates the distance (center distance) of a pixel currently under composition from the screen center. Next, a correction value calculation unit 1108 calculates the correction value of the exposure error from the correction coefficient 1103 and the center distance. As described above concerning the error exposure detection unit 716 in FIG. 8, when the exposure error is represented by an approximate line, the correction coefficient 1103 is represented by the coefficients of a polynomial expression representing the approximate line. Assuming that the polynomial expression is a fourth-order expression, and letting s be the center distance, the approximate line is represented by $$a \times s^4 + b \times s^3 + c \times s^2 + d \times s + e \qquad (7)$$

where a, b, c, d, and e are the coefficients of the polynomial expression.

A correction value z is given by $$z = 1/(a \times s^4 + b \times s^3 + c \times s^2 + d \times s + e) \qquad (8)$$

Next, a level calculation unit 1109 multiplies the result by the exposure amount information 1102, thereby calculating the level matching gain value 1106. Letting E be the exposure amount, a level matching gain value G is given by equation (3).

The level matching gain value 1106 calculated by the level setting unit 707 of this embodiment is sent to the level gain processing unit 709 shown in FIG. 7, and level matching of the under-exposure image data is performed. The level matching gain value 1106 changes in accordance with the center distance of the image, and changes to correct the exposure error. That is, level matching including exposure error correction is performed for the under-exposure image data.

Figure 15A:
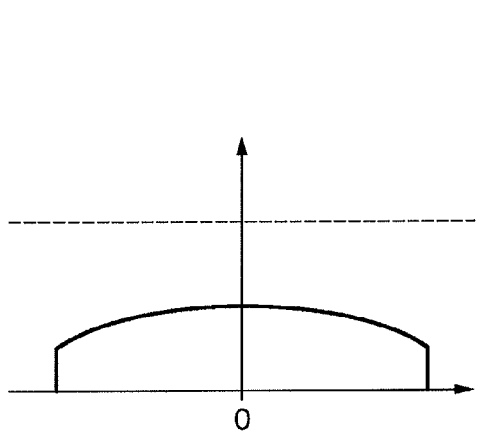
FIGS. 15A to 15D are views showing exposure errors caused by conventional shading.
Figure 15B:
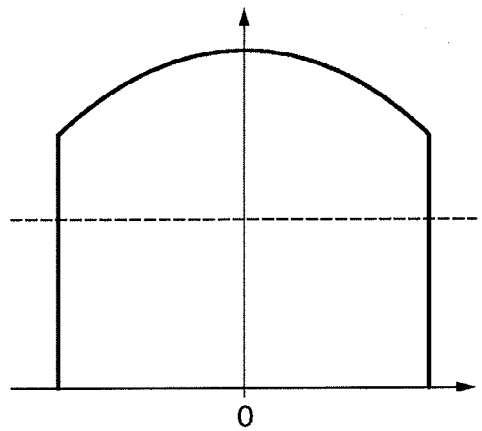
Figure 15C:
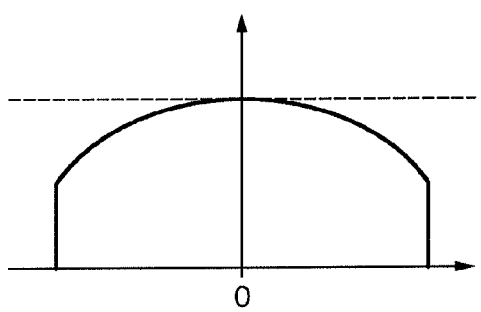
Figure 15D:
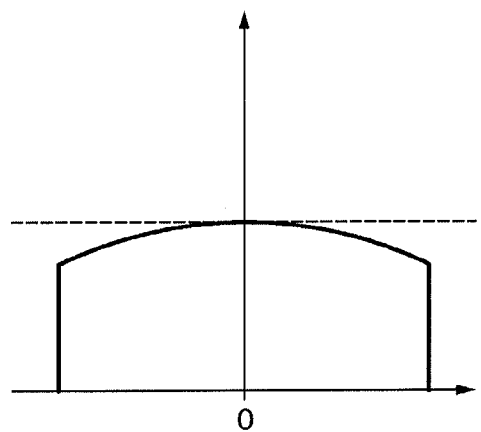

FIGS. 12A to 12D show pixel level distributions when the level matching including exposure error correction information is performed. FIG. 12A shows the pixel level distribution of an under-exposure image shot in a stopped-down-aperture state, immediately after shooting, and corresponds to FIG. 15A. Similarly, FIG. 12B shows the pixel level distribution of an over-exposure image shot in a full-aperture state, immediately after shooting, and corresponds to FIG. 15B. For the over-exposure image, level matching as before is performed. Hence, a pixel level as shown in FIG. 12D is obtained as the pixel level after level matching, which corresponds to FIG. 15D. On the other hand, for the under-exposure image, level matching including exposure error correction is performed. That is, level matching is performed such that the difference in the pixel level shown in FIG. 12A, which changes depending on the position on the screen, is corrected. For this reason, the pixel level after the level matching has the same influence of shading, as shown in FIG. 12C.

As a result, the pixel level of the under-exposure image matches that of the over-exposure image all over the screen. Motion detection shown in FIG. 7 and the like can normally be performed at any position on the screen.

As described above, according to this embodiment, an exposure error according to the distance from the screen center is detected and corrected, thereby normally performing motion detection when composing a plurality of images shot under different exposure conditions.

Note that in this embodiment, since focus is placed on the exposure error caused by shading, the exposure error according to the distance from the screen center is corrected. If the curtain speed unevenness of the shutter according to the first embodiment is added to the shading, the approximate calculation unit 811 obtains the approximate line in consideration of the positions in the vertical direction and horizontal direction on the image when obtaining correction coefficient. In the level setting unit 707, the center distance calculation unit 1107 does not perform processing, and the correction value calculation unit 1108 directly calculates the correction coefficient from the number 1104 of lines in the vertical direction and the number 1105 of lines in the horizontal direction.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-197900, filed Sep. 7, 2012, which is hereby incorporated by reference herein in its entirety.

What is claimed is:

1. An image processing apparatus which composes a plurality of images shot under different exposure conditions, comprising:
    a detection unit configured to detect an exposure error of a detection target image according to a position in the detection target image, the detection target image having an exposure amount smaller than a predetermined exposure amount;
    a calculation unit configured to calculate correction information to correct the exposure error detected by the detection unit;
    an adjustment unit configured to perform level adjustment on the detection target image in accordance with the exposure amount of the detection target image and the correction information; and
    an image composition unit configured to generate a composite image by composing the plurality of images including the detection target image that has undergone the level adjustment,
    wherein the detection unit detects the exposure error by defining, out of the plurality of images, a reference image having an exposure amount not less than the predetermined exposure amount, and comparing the reference image with the detection target image, and
    wherein the calculation unit calculates the correction information for the detection target image and does not calculate the correction information for the reference image,
    wherein the image having an exposure amount smaller than the predetermined exposure amount is shot with a shutter speed higher than a predetermined shutter speed and the image having an exposure amount not less than the predetermined exposure amount is shot with a shutter speed not higher than the predetermined shutter speed.

2. The apparatus according to claim 1, wherein the reference image is an image having a largest exposure amount.

3. The apparatus according to claim 1, wherein the detection unit has:
    a measurement unit configured to divide each of the reference image and the detection target image into subareas and obtain a measurement value for each subarea from a luminance value of each subarea;
    a comparison unit configured to compare the measurement values of subareas of the reference image and the detection target image at a same position, so as to obtain a comparison value of each subarea; and
    a tally unit configured to tally the comparison values,
    wherein the exposure error is detected for the detection target image based on a tally result of the tally unit.

4. The apparatus according to claim 1, wherein when comparing the reference image with the detection target image, the detection unit performs the comparison including a preset exposure amount at time of shooting.

5. The apparatus according to claim 1, wherein the position in the detection target image includes a position in one of a vertical direction and a horizontal direction of the detection target image.

6. The apparatus according to claim 1, wherein the position on the image includes a distance from a center of the detection target image.

7. The apparatus according to claim 1, wherein the calculation unit calculates the correction information corresponding to only a position in a vertical direction of the detection target image and the correction information corresponding to only a position in a horizontal direction.

8. The apparatus according to claim 1, further comprising a photographing unit configured to shoot the plurality of images under the different exposure conditions.

9. An image processing method of composing a plurality of images shot under different exposure conditions, the method comprising:
    detecting an exposure error of a detection target image according to a position in the detection target image, the detection target image having an exposure amount smaller than a predetermined exposure amount;
    calculating correction information to correct the detected exposure error;
    performing level adjustment on the detection target image in accordance with the exposure amount of the detection target image and the correction information; and
    generating a composite image by composing the plurality of images including the detection target image that has undergone the level adjustment,
    wherein in the detecting of the exposure error, the exposure error is detected by defining, out of the plurality of images, a reference image having an exposure amount not less than the predetermined exposure amount, and comparing the reference image with the detection target image,
    wherein in the calculating of the correction information, the correction information is calculated for the detection target image and is not calculated for the reference image, and
    wherein the image having an exposure amount smaller than the predetermined exposure amount is shot with a shutter speed higher than a predetermined shutter speed and the image having an exposure amount not less than the predetermined exposure amount is shot with a shutter speed not higher than the predetermined shutter speed.

10. A non-transitory computer-readable storage medium storing a program for causing a computer to execute an image processing method of composing a plurality of images shot under different exposure conditions, the method comprising:
    detecting an exposure error of a detection target image according to a position in the detection target image, the detection target image having an exposure amount smaller than a predetermined exposure amount;
    calculating correction information to correct the detected exposure error;
    performing level adjustment on the detection target image in accordance with the exposure amount of the detection target image and the correction information; and generating a composite image by composing the plurality of images including the detection target image that has undergone the level adjustment, wherein in the detecting of the exposure error, the exposure error is detected by defining, out of the plurality of images, a reference image having an exposure amount is not less than the predetermined exposure amount, and comparing the reference image with the detection target image, wherein in the calculating of the correction information, the correction information is calculated for the detection target image and is not calculated for the reference image, and wherein the image having an exposure amount smaller than the predetermined exposure amount is shot with a shutter speed higher than a predetermined shutter speed and the image having an exposure amount not less than the predetermined exposure amount is shot with a shutter speed not higher than the predetermined shutter speed.

* * * * *